Figure 1:
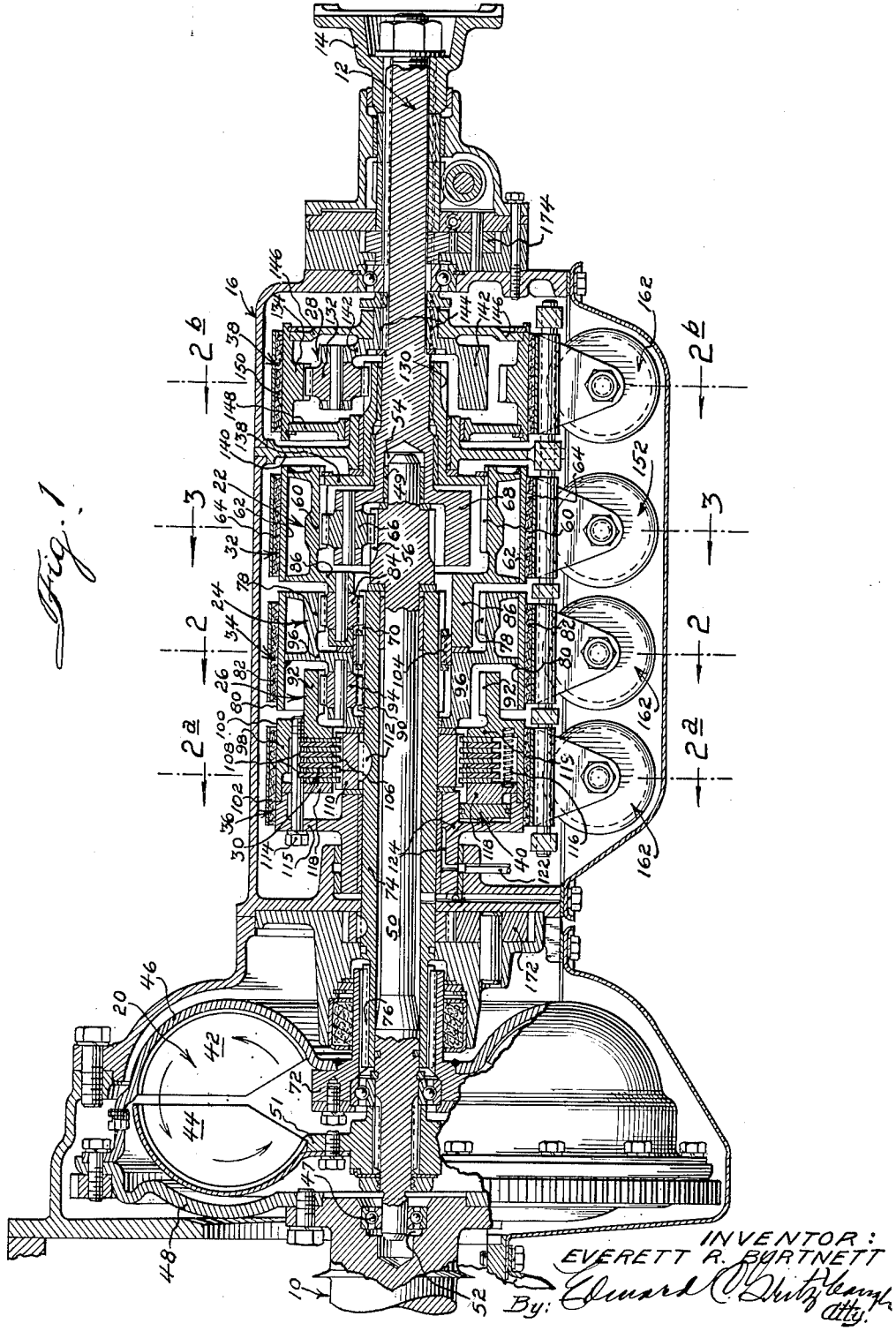

April 15, 1952     E. R. BURTNETT     2,592,537
POWER-TRANSMITTING SYSTEM
Filed Feb. 1, 1946     6 Sheets-Sheet 1

INVENTOR:
EVERETT R. BURTNETT

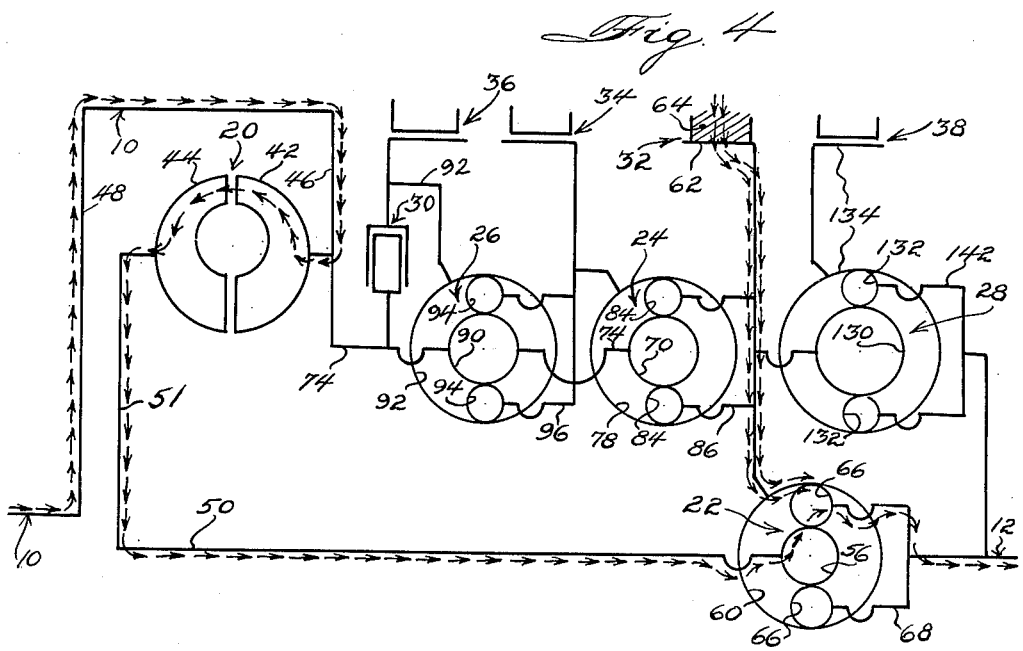
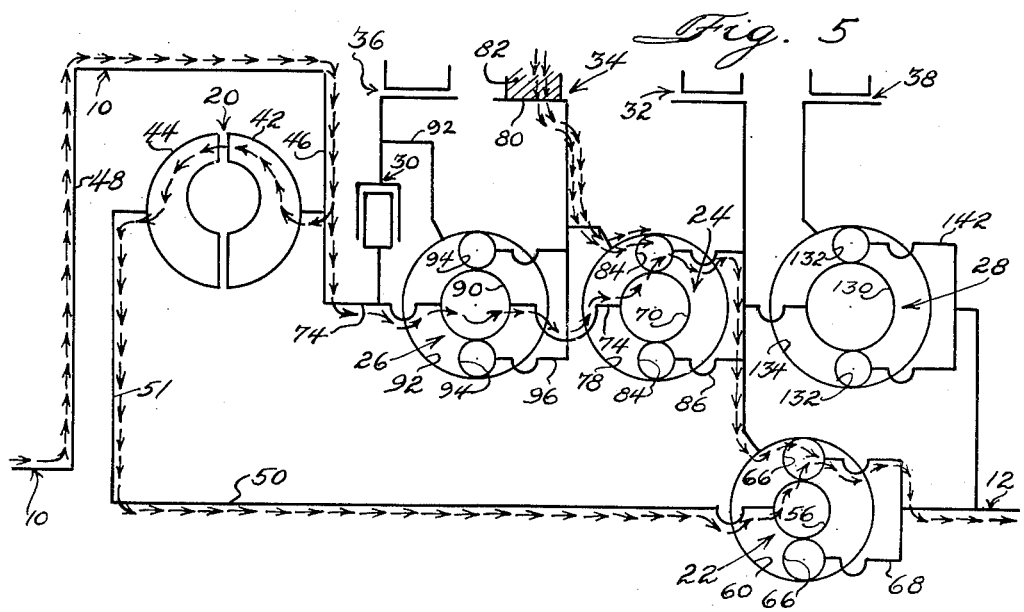

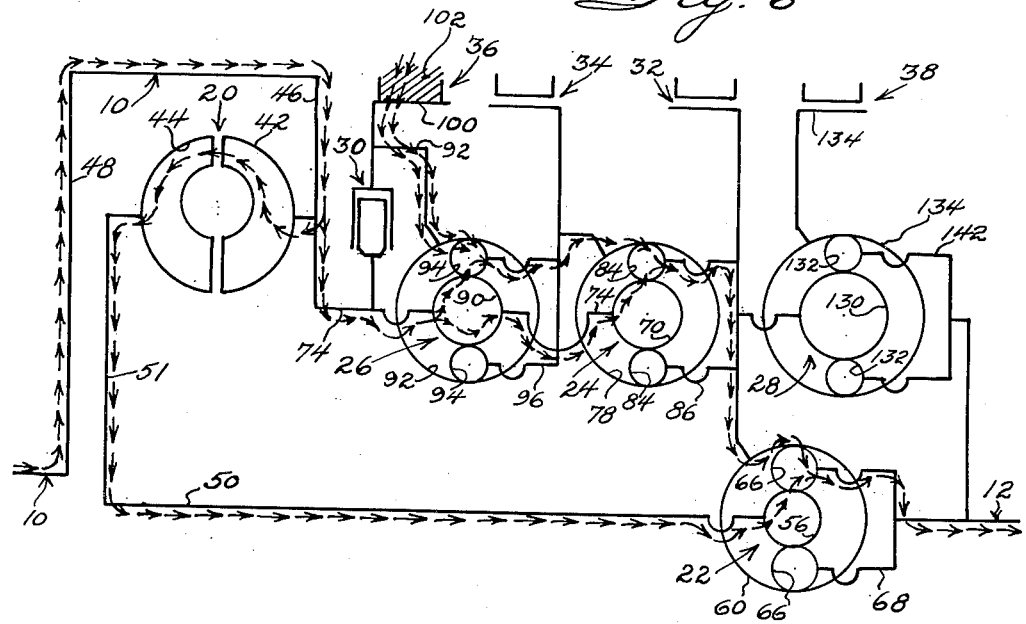
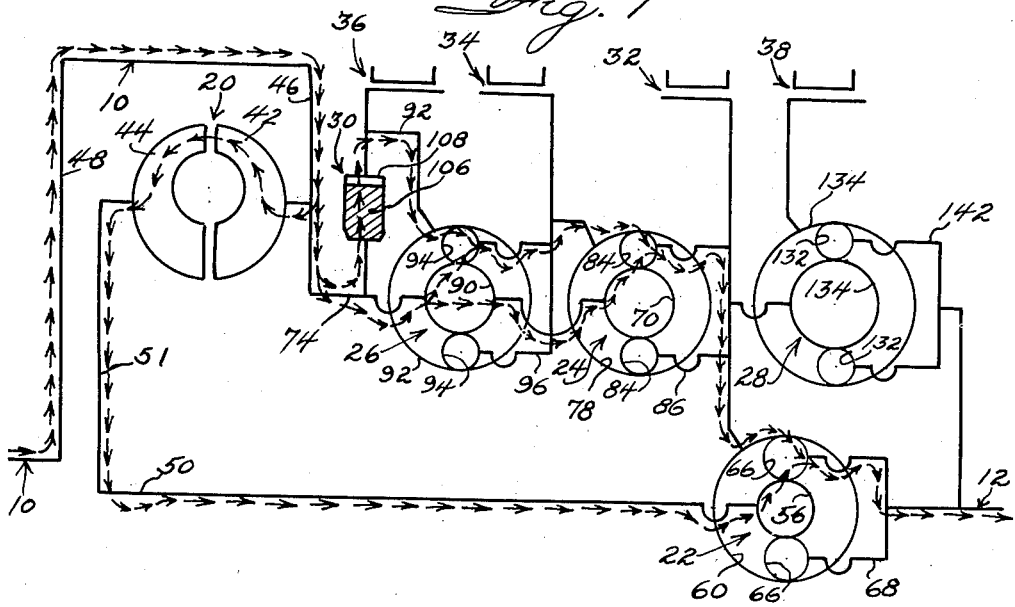

April 15, 1952   E. R. BURTNETT   2,592,537
POWER-TRANSMITTING SYSTEM
Filed Feb. 1, 1946
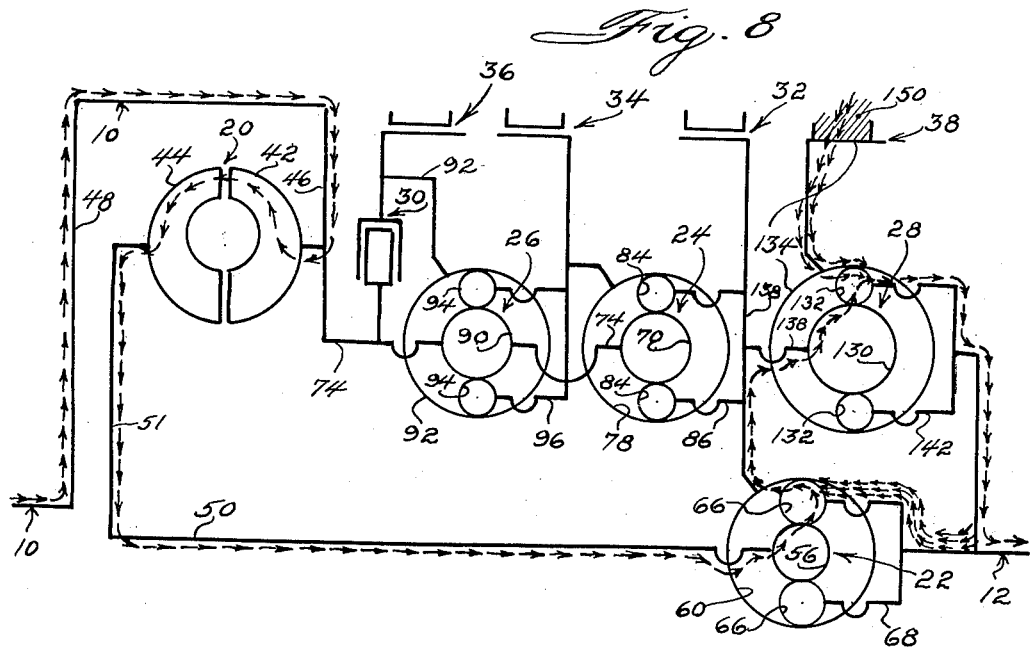
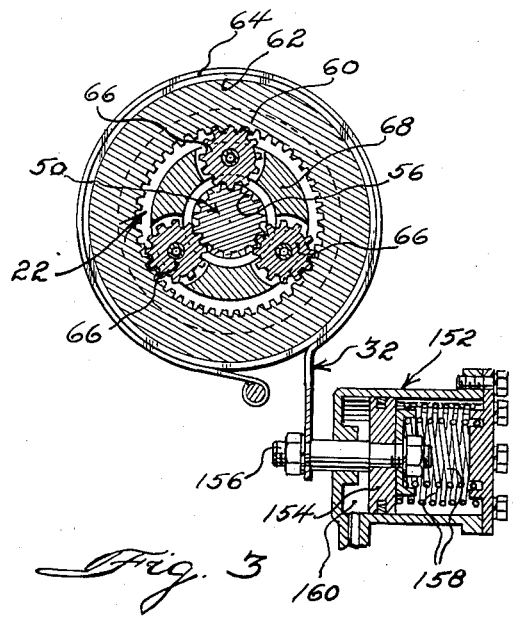
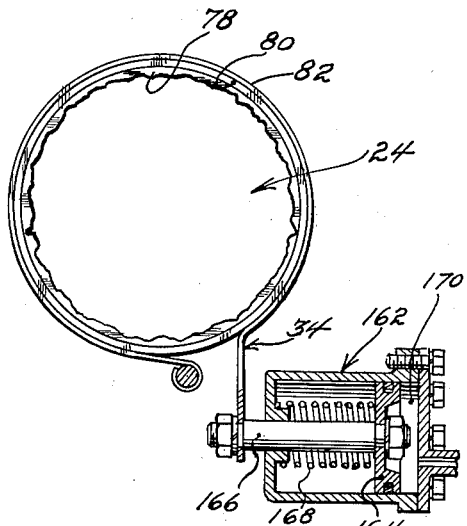
INVENTOR:
EVERETT R. BURTNETT

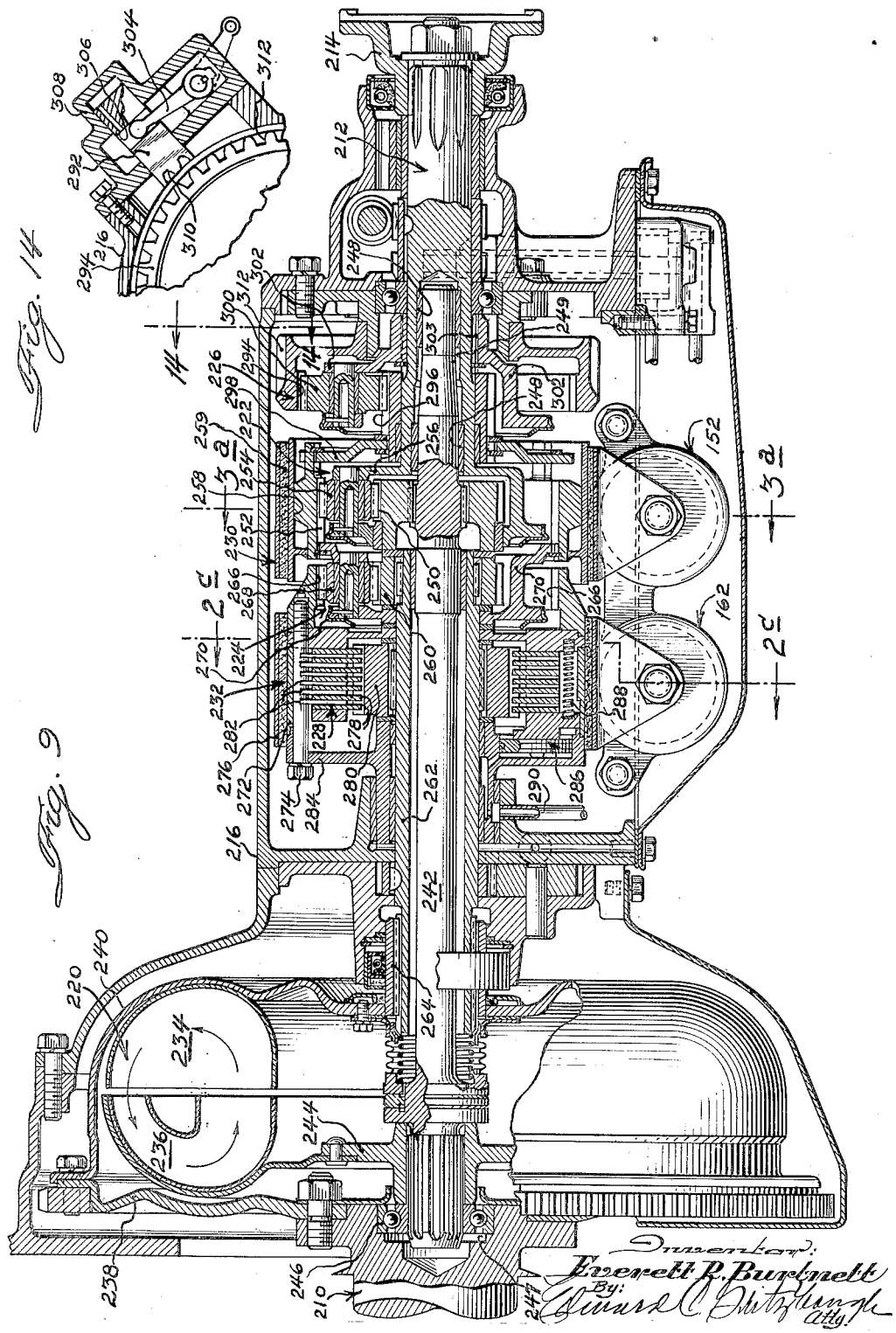

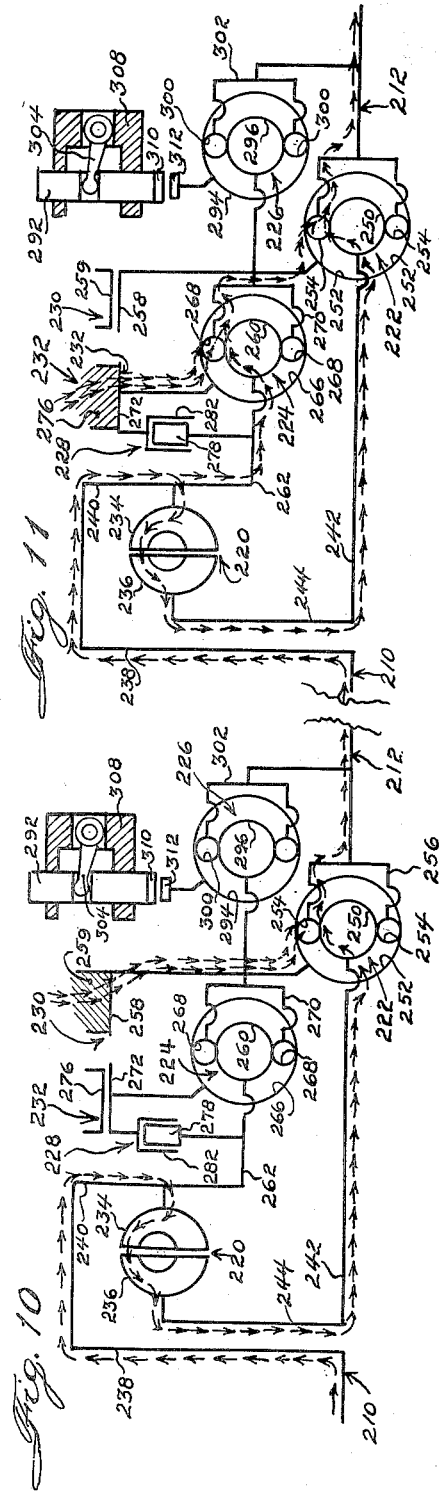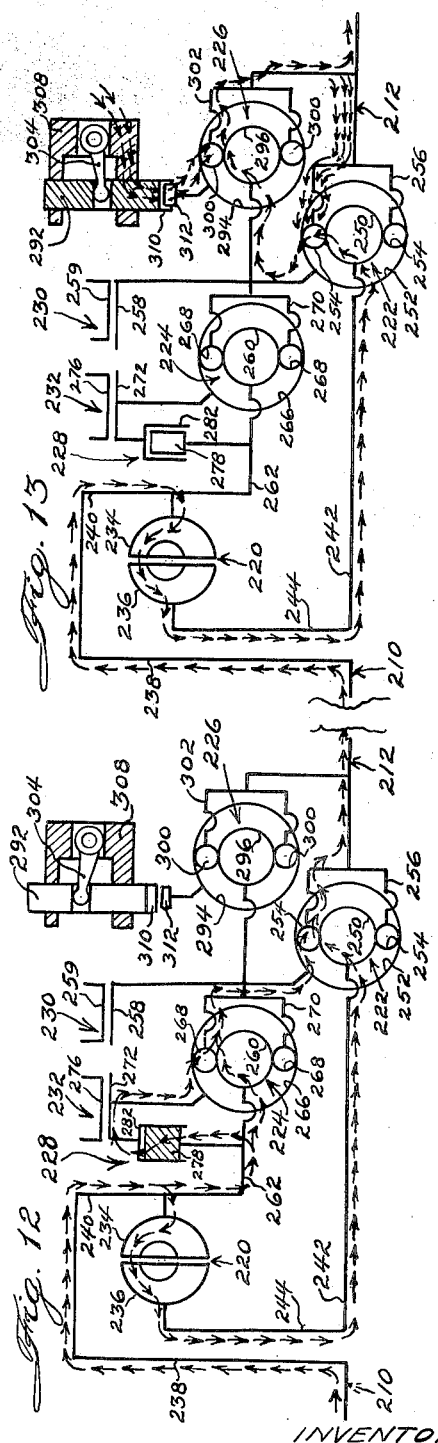

Patented Apr. 15, 1952

2,592,537

UNITED STATES PATENT OFFICE 2,592,537

POWER-TRANSMITTING SYSTEM

Everett R. Burtnett, Inglewood, Calif., assignor to Borg-Warner Corporation, Chicago, Ill., a corporation of Illinois Application February 1, 1946, Serial No. 644,718

19 Claims. (Cl. 74—677)

1

The present invention pertains to power transmitting systems and has as a principal object the provision of a new and improved variable speed and variable torque transmitting system of the type including a fluid turbine torque transmitting device and adapted to divide and recombine torque between driving and driven shafts to improve generally the driving efficiencies of the system. This system is particularly adapted for automotive drives.

Another object of the present invention is the provision of a new and improved variable speed and variable torque power transmitting system of the type including a fluid turbine system having a first driving speed ratio wherein all the torque is delivered through operating fluid, and by successively higher driving speed ratios wherein lesser proportions of the input torque are delivered through the operating fluid of the turbine system, and the remainder is transmitted in parallel with the turbine system through a gear drive contributory to each of successively higher driving speed ratios and providing selection of stepped ratios of torque multiplication dividing the input torque with the fluid turbine connection and wherein the changes between ratios may be made during the transmission of torque; i. e., without interruption of the power drive to the load.

More specifically, the preceding object of this invention is to provide a change speed and a change torque ratio drive transmitting mechanism having a fluid turbine torque transmitting system and a variable speed ratio gearing parallel to the fluid turbine torque transmitting system and giving plural torque multiplying power transmitting ratios which divide input torque with the fluid turbine torque transmitting connection, and which different gear ratios are selectively spaced, so that selective different split proportions of the input torque are transmitted parallel to the fluid turbine torque transmitting connection and which will obtain multiplication in the gearing for recombining with the other split proportion of the input torque delivered through the fluid turbine torque transmitting connection before delivery to a load shaft.

A further object of the present invention is to provide parallel drive transmitting mechanism of the character set forth in the preceding object and characterized by the gearing forming the drive transmitting arrangement parallel to the fluid turbine system, comprising a plurality of epicyclic gear units compounded in series and coupled to each other for establishment of another epicyclic gear unit, augmenting the division of the plurality of epicyclic gear units priorly effective and yielding a slow speed high torque multiplying drive and yielding a successively higher speed and relatively lower torque multiplying ratio with the fluid turbine torque transmitting connection.

One of the primary objects of the present invention is the provision of a new and improved variable speed and variable torque power transmitting system of the type including a fluid turbine torque transmitting system wherein all the input torque is initially transmitted from the driving to the driven shaft through the fluid turbine transmitting connection, and wherein decreased proportions of torque are transmitted through said fluid turbine torque transmitting connection by a parallel multi-power transmitting mechanism yielding a plurality of successively higher driving speed ratios. The remainder is transmitted in parallel to the fluid turbine torque transmitting connection through change speed gearing, and further, wherein the change speed gearing is constructed and arranged to provide successively higher driving speed ratios and lower torque converting drives through gearing parallel to the fluid turbine torque transmitting connection.

More specifically, the primary object of this invention is to provide a multiple or parallel change speed and change torque ratio power transmitting mechanism including a fluid turbine torque transmitting system and a parallel connected gearing system characterized by (1) a first speed wherein all the input shaft torque is transmitted through the fluid turbine torque transmitting connection at low torque and high speed values and converted therebeyond into high torque at low speed to start the driven shaft in motion; (2) a second speed wherein a portion of the input shaft torque is transmitted through the fluid turbine torque transmitting connection and the remainder is transmitted through the gearing to yield high torque and low speed in parallel with the fluid turbine torque transmitting connection; and (3) a third speed wherein a lesser portion of the input torque is transmitted through the fluid turbine torque transmitting connection and a greater portion through the gearing to yield a lower torque and higher driving speed ratio than the second speed.

A further object of the present invention is to provide a power transmitting system of the character set forth in the preceding paragraph and further characterized by a fourth speed wherein a still lesser portion of the input torque is transmitted through the fluid turbine torque transmitting connection and a relatively greater portion through the gearing and at a still lower torque and higher speed.

A further object of the present invention is to provide a new and improved change speed power transmitting system of the character set forth in the two preceding paragraphs including a fluid turbine torque transmitting system and a gearing system and wherein the gearing system includes a plurality of multiple epicyclic gear units compounded in series and forming a drive transmitting means parallel to the fluid turbine system and characterized by (1) a sequence of three forward speed ratios parallel to the fluid turbine torque transmitting system, and (2) the three speeds parallel to and in conjunction with the drive through the fluid turbine system yielding selectively and successively the others of the three higher driving speed ratios of the four forward speed sequence for connecting the driving and driven shafts.

A further object of the present invention is to provide a new and improved power transmitting system of the character set forth in the three preceding paragraphs and further characterized by the highest speed being a direct, non-torque multiplying drive.

A still further object of the present invention is to provide a new and improved fluid turbine and epicyclic gearing type multiple speed drive characterized by simplicity of construction and ease of control.

Another object of the present invention is to provide a new and improved power transmitting system comprising a fluid turbine torque transmitting system and epicyclic gearing arranged in parallel between driving and driven shafts and wherein the gearing for selection of multiple speed driving ratios for dividing input torque with the fluid turbine torque transmitting connection is controlled by selectively, and preferably alternately, operable reaction brake devices to provide different rates of torque multiplication and dividing input torque with the fluid turbine torque transmitting connection.

A further object of the present invention is to provide a new and improved power transmitting system of the character set forth in the preceding paragraph including also a selectively operable clutch unit for controlling the epicyclic gearing to provide still another driving speed effective to divide input torque with the fluid turbine torque transmitting connection.

Another object of the present invention is the provision of a new and improved power transmitting system including parallel connected fluid turbine and epicyclic gearing drive wherein the latter includes a pair of epicyclic gear trains having sun gears fixedly secured to and driven by the driving shaft, and selectively controllable annulus gears providing selective control of the ratios of torque division and torque multiplication in the epicyclic gearing and which divides input torque with the fluid turbine torque transmitting connection.

A further object of the present invention is to provide a new and improved power transmitting system of the character set forth in the three preceding objects and further characterized by a plural number of alternately engageable reaction brake units, each effective to establish a gear drive utilizing an increased number of epicyclic gear units and a higher driving speed and lower multiplication of the torque, and each higher driving speed and lower rate torque multiplication effective to reduce the division of the torque and the ratio of the input torque for delivery through the fluid turbine torque transmitting system, and still further characterized by the engagement of a clutch unit for establishing still another driving speed ratio through the gearing, said clutch unit being effective to lock only the gear members of a portion of the epicyclic gearing, and effecting the drive through the gearing to reduce still further the proportion of the input torque delivered through the fluid turbine torque transmitting system and leaving a portion of the gearing functioning to permit a slip factor in the drive through the fluid turbine torque transmitting system and also effective to recombine the divided torque before delivery to the load shaft.

Other objects and advantages of the present invention will become apparent from the ensuing description of illustrative embodiments thereof, in the course of which reference is had to the accompanying drawings, in which:

Figure 1 is an axial cross-sectional view of a power transmitting system constructed in accordance with the present invention;

Figure 2 is a fragmentary cross sectional view taken along the line 2—2, and 2b—2b of Figure 1 (and along lines 2c—2c of Figure 9);

Figure 3 is a fragmentary cross sectional view taken along the line 3—3 of Figure 1 and also along line 3a—3a of Figure 9;

Figures 4, 5, 6, 7, and 8 are schematic representations of the power transmitting system illustrated in Figure 1 conditioned for first, second, third, and fourth forward speed drives, and reverse drive, respectively;

Figure 9 is a view similar to Figure 1 of another embodiment of the invention;

Figures 10, 11, 12, and 13 are schematic representations of the power transmitting system illustrating in Figure 9 conditioned for first, second, and third forward speed drives, and reverse drive, respectively; and Figure 14 is a fragmentary cross sectional view taken along the line 14—14 of Figure 9.

With reference to the Figures 4 to 8, inclusive, and 10 to 13, inclusive, the single row of arrows, respectively, indicates the prevailing power flow, while the double row of arrows indicates the prevailing reaction connection.

With reference to the drawings and first to Figures 1 to 8, inclusive, the power transmitting system of the present invention has been illustrated in conjunction with an automotive vehicle. It includes a driving shaft 10 and a driven shaft 12, the former of which is driven by the usual engine and the latter of which is operatively connected to the driving wheels of the vehicle through suitable means such as a coupling member 14 splined and bolted to the rear end of the driven shaft 12.

The illustrated embodiment of the present invention is housed within a transmission case indicated as a whole by reference character 16, and forms a construction easily controlled selectively to yield four forward speeds and a reverse drive.

The system comprises a slip type torque transmitting coupling, preferably a fluid turbine unit 20, a plurality of epicyclic gear units 22, 24, 26, and 28, and a single clutch unit 30. In the order referred to the gear units 22, 24, and 26 are successively placed in operation in the first, second, and third forward speeds and will, therefore, be called the first, second, and third epicylic gear units, respectively. The epicylic gear unit 28 is used in reverse drive and clutch 30 is used in the fourth forward speed, which is a direct drive.

The fluid coupling 20 participates in the drive in all forward speeds and in reverse. In the first (low) forward speed it handles all the input torque, but only a portion in the second speed, and successively lesser portions in the third and fourth speeds, respectively.

The fluid driving pump wheel 42 of the fluid coupling 20 is secured to and is adapted to rotate with the input shaft 10, and a first driven shaft 50 which is integral with the sun gear 56 of the gear unit 22 and which is also secured to rotate with the driven turbine wheel 44 provides that the sun gear of the first epicylic gear unit 22 will be directly rotated from the input shaft 10 when the speed of the latter is sufficient that the fluid circulated by the pump wheel 42 transmit the required input torque to the turbine 44.

Preferably each of the four epicylic or planetary gear units comprise a sun gear adapted to supply power for speed reduction in the respective gear unit, an annulus gear adapted to be held against rotation for said speed reduction in the respective gear unit, and a carrier adapted to be driven at said speed reduction by supporting planet pinions, each for rotation around its respective axis thereon. The planet pinions supported by their respective carriers are in mesh with both the sun and the annulus gears of the respective epicylic gear unit.

The planet carriers of the two rearmost epicylic gear units are fixed to rotate with the output shaft 12. The sun gear 130 of the rear gear unit 28 is fixed to rotate with the annulus gear 60 of the first gear unit 22. By this arrangement when the annulus gear 60 and the sun gear 130 are free to be rotated reversely relative to the sun gear 56, and the annulus gear 134 is held against rotation, the torque of the sun gear 56 will be reversed in the planet pinions 66 driving the annulus gear 60 and the sun gear 130. The thus reversed torque will be multiplied between the sun gear 130 and the driven member which includes the carrier 142 and the output shaft 12. Load resistance manifested in the driven member, which includes the output shaft 12 and the carrier 68, will suffice as a reaction effective to sustain a reversing torque effect between the sun gear 56 and the annulus gear 60 through the planet pinions 66.

A reaction brake unit 38 for reverse drive consists of an external drum surface on the member within which the internal teeth which form the annulus gear 134 are cut, and a brake band 150 adapted by suitable anchorage at one end and actuation means (Figure 2) associated with the other end to be energized to grip and hold the gear 134 against rotation.

The annulus gear 60 of the gear unit 22 is fixed to rotate with the planet carrier 86 of the gear unit 24. The annulus gear 78 of the gear unit 24 is fixed to rotate with the planet carrier 96 of the gear unit 26. The externally gear toothed tubular shaft 74 which is splined at 76 to the pump wheel 42 and thus is also secured to rotate with the input shaft forms an input sun gear common to both epicylic gear units 24 and 26. The friction clutch 30 is arranged between the sun gear tubular shaft 74 and the annulus gear 92 of the epicylic gear unit 26. It will be noted that while the primary input sun gears of the epicylic gear units 24 and 26 are integral, the primary input sun gear 56 of the epicylic gear unit 22 is free to rotate relative to the respective gear of either the gear unit 24 or the gear unit 26.

Drums 62, 80, and 100, respectively, are fixed to rotate with the annulus gears 60, 78, and 92 of the gear units 22, 24, and 26, and brake bands 64, 82, and 102, respectively, are mounted selectively to be energized to grip and hold the drums 60, 78, and 92 against rotation. Accordingly, the reaction braking unit 38 is for conditioning the mechanism for reverse drive, brake unit 32 for the first forward speed gear ratio, brake unit 34 for the second forward speed gear ratio, brake unit 36 for the third forward speed gear ratio, and clutch unit 30 for direct drive fourth speed.

A suitable combination in which normally a spring 153 is effective in energizing application of a reaction brake band, and in which release of same is adapted to be hydraulically secured, is illustrated by Figure 3, whereas in comparison, Figure 2 shows a reversed arrangement of the spring actuator 168 and an adaptation for application of a given reaction brake band to be hydraulically energized.

The driving clutch component 106 of the clutch unit 30 is mounted to rotate with, but normally for a degree of axial movement relative to, the tubular shaft 74, which is secured to rotate with the input shaft 10. The driven clutch component 108 of this unit is formed with circumferentially spaced notches in its outer periphery accommodating the extension bolts 114 therethrough, whereby the driven clutch component is mounted to rotate with the annulus gear 92 of the third epicylic gear unit 26. An axially movable presser clutch plate 118 and a bottom pressure clutch part 119 complete the driven clutch component of this unit secured to rotate with the annulus gear 92.

Springs 116 tend normally to press the presser plate 118 away from the engageable mating clutch component, while oil pressure admitted through a duct 122 and passageway 124 to a series of circumferentially spaced cylinders is adapted to force the pistons 40 and presser plate 118 to the right as shown in Figure 1 to pack the driving and driven plates 106 and 108.

Front and rear gear oil pumps 172 and 174, respectively, driven by the primary input power member and by the output shaft 12, are adapted to produce the fluid pressure required for gear ratio changing operations, the front pump being effective when only the power source is operating, and the rear pump being effective when the engine is at rest and the vehticle is being pushed or is descending a hill.

First forward speed gear ratio will obtain when the band 64 is applied, the bands 82, 102, and 150 are released, the clutch 30 open, and when the pump wheel 42 is rotated at sufficient speed to induce hydraulic transmission of sufficient torque from the wheel 42 to the wheel 44. In this setting of the mechanism all of the input torque will be delivered through the fluid coupling 42, 44, by way of example, 3.5:1 speed reduction obtained between the sun gear 56 and the driven member which includes the carrier 68 and output shaft 12, by virtue of the applied brake band 64 holding the annulus gear 60 against rotation. The simultaneously released bands 82, 102, and 150 permit the annulus gears 78 and 92 to idle and rotate backwards and the annulus gear 134 to idle and rotate forward in the same direction as the drive.

Second forward speed gear ratio will obtain when the band 82 is applied, the bands 64, 102, and 150 are off, the clutch 30 open, and when at least one of the turbine wheels is rotated at sufficient speed for the resultant fluid couple between the wheels 42 and 44 to sustain the circuit of parallel driving connections which yield the second speed gear ratio. In this setting, by virtue of the annulus gear 78 being held against rotation by the applied band 82, a portion of the input torque is multiplied between the sun gear 70 and the carrier 86 and the integral annulus gear 60. Accordingly, the carrier 68 and the integral output shaft 12 are rotated at a differential of speed resulting from the speed of rotation of the sun gear 56 imparted thereto directly from the input shaft by the fluid drive coupling and from the gear reduced speed of rotation of the annulus gear 60 imparted indirectly thereto from the input shaft through the epicyclic gear unit 24. accordingly, only a portion of the input torque is delivered through the fluid coupling in the second driving speed gear ratio.

Third forward speed gear ratio will obtain when the band 98 is applied, the bands 64, 82, and 150 are off, the clutch 30 is disengaged, and when at least one of the turbine wheels is rotated at sufficient speed for the resultant fluid couple between the turbine wheels 42 and 44 to sustain the currently drivingly established series-parallel power transmitting circuit. By virtue of the band 102 being applied holding the annulus gear 92, a first portion of the input torque will be multiplied between the sun gear 90 of the tubular shaft 74 and the carrier 96 and the integral annulus gear 78. A second portion of the input torque will be imparted by the sun gear portion 70 of the tubular shaft 74 to the planet pinions 84. Accordingly, the combination of the two epicyclic gear units 24 and 26 will drive the annulus gear 60 at a fixed ratio of reduced speed. This rotation of the annulus gear 60 together with the rotation imparted to the sun gear 56 by the fluid coupling 20 will result in the carrier 68 and the integral output shaft 12 being rotated at a differential of speed between the speed of the sun gear 56 and that of the annulus gear 60. Accordingly, the fluid coupling is required to deliver a lesser portion of the input torque.

Fourth speed (direct drive) will obtain when the clutch 30 is engaged, all the reaction bands released, and when at least one of the turbine wheels 42 and 44 is rotated at sufficient speed to result in the fluid drive couple transmitting the torque required to sustain the direct drive circuit of parallel driving connections between the primary input shaft and the output shaft. Since the engaged condition of the clutch 30 will lock the elements of the two epicylic gear units 24 and 26 and accordingly the annulus gear 60 all to rotate as a unit with the primary input shaft which includes shaft 10 and shaft 74, the fluid coupling is required to deliver a still lesser portion of the input torque by virtue of the annulus gear 60 currently being connected to rotate at the same speed as the input speed to the fluid coupling.

It will be noted that this combination of variable speed ratio transmission and ratio actuation means therefor provides that the engine compression may be used as a brake against vehicle momentum when coasting through the inverse ratios of any one of the lower driving speed gear ratios in which the mechanism may be set, as well as when it is set in direct drive.

The embodiment of the invention illustrated in Figures 9 to 14, inclusive, resembles the previously described one in many respects. It differs therefrom only in that only three forward speeds and reverse drive for propelling the driven shaft 212 are provided and in the structural arrangement of the reverse drive. With reference now to Figures 9 to 14 and more particularly to Figure 9, it will be noted that the driving and driven shafts 210 and 212 may be driven by the engine and operatively connected to the driving wheels of a vehicle, respectively. The driven shaft may be connected to the driving wheels by means including a coupling member 214 splined and bolted to the shaft.

The system is housed within the transmission case 216. It comprises a fluid turbine coupling 220 and a plurality of epicyclic gear units 222, 224, and 226 and a single clutch unit 228. The epicyclic gear units 222 and 224 and clutch 228 are successively placed in operation in the first, second, and third forward speeds. The epicyclic gear unit 226 is used in series with the gear unit 222 to yield reverse drive between the first and second driven shafts 242 and 212.

The fluid coupling 220 is again used in all the speeds for connecting the driving and driven shafts 210 and 212. In first (low) forward speed gear ratio all the torque, in second speed gear ratio only a portion, and in third speed (direct drive) a lesser portion of the torque is transmitted through the coupling. In the latter speed a greater portion of the torque is transmitted through the all mechanical means torque path parallel relative to the fluid coupling by virtue of the annulus gear 252 of the divided torque recombining epicyclic gear unit 222 being coupled as a result of the engaged clutch unit 228 to rotate with and accordingly at the same speed as the driving shaft 210, whereas in the second speed it is rotated at a fixed ratio of reduced speed relative to the shaft 210.

The fluid turbine system includes a driving turbine element 234 and a driven element 236, both of which may be of conventional construction. The driving element is driven by the input or driving shaft 210 through a two-part housing 238, 240. The driven element 236 is connected to a first driven shaft 242 by a collar 244 splined to the shaft 242 which is rotatably supported arranged in bearings 246 and 248 in recesses 247 and 249 formed in the contiguous ends of the driving and driven shafts, respectively.

As in the first embodiment the fluid coupling is connected individually to rotate solely the sun gear of the first epicyclic gear unit, the planet carrier of which is associated permanently to rotate with the driven shaft 212. In this embodiment preferably this sun gear is provided as a separate member and is splined to its driving shaft 242.

First forward speed (low) gear ratio obtains between the shafts 210 and 212 when the brake band 276 and the clutch 228 are released, and the brake band 259 is applied effective to hold the drum and the annulus gear 252 secured thereto against rotation, but conditionally, of course, upon at least one of the two turbine wheels 234 and 236 being rotated at sufficient speed for the resulting fluid circulation therein hydraulically to transmit the required torque to the other turbine wheel. The torque is multiplied between the sun gear 250 and the carrier 256 which is integral with the output shaft 212.

Second forward speed gear ratio obtains between the shafts 210 and 212 when the band 259 and the clutch 228 are released, and the band 276 is applied, effectively holding the drum and the annulus gear 266 which is fixed thereto against rotation. Accordingly, when a sufficient portion of the torque is transmitted through the fluid coupling and the sun gear 250 to sustain a driving balance with the remaining portion of torque delivered through the indirect coupling of the epicyclic gear unit 224 and the annulus gear 252 to the planet pinions 254, the second driving speed gear ratio will be in effect.

Third forward speed (direct drive) will obtain between the shafts 210 and 212 when the bands 259 and 276 are released, the clutch 228 is engaged, and at least one of the two turbine wheels is rotated at sufficient speed to result in the required portion of the torque being hydraulically transmitted therebetween to sustain a driving balance, with the remaining portion of the torque delivered at one to one speed ratio through the engaged clutch locked condition of the elements of the epicyclic gear unit 224 to the annulus gear 252.

Reverse drive will obtain between the first and second driven shafts 242 and 212 when the bands 259 and 276 and the clutch 228 are released and the pawl 292 (Figure 14) is engaged with the external teeth 312 cut in the outer surface of the annulus gear member 294. The driving torque transmitted by the fluid coupling to the shaft 242, sun gear 250 and thence imparted to the planet pinions 254, meeting the load resistance manifested in the driven shaft 212 and the integral carrier 256, will be reversed by the planet pinions 254 to rotate the annulus gear 252 and the sun gear 296 which is fixed to rotate therewith. In turn the thus reversed torque will be transmitted through and multiplied in the epicyclic gear unit 226 between the sun gear 296 and the planet carrier 302 thereof. It will be noted that this carrier is splined at 303 to rotate with the driven shaft 212.

Thus it will be seen that in each of the embodiments illustrated I have provided a fluid turbine-epicyclic gearing drive mechanism in which the application of an alternate reaction brake, effective to cause division of the torque with the fluid turbine drive component of the mechanism, will condition the latter to drivingly connect the primary driving and the output shaft in the second forward driving speed gear ratio and which may or may not be controlled to succeed the low first driving speed gear ratio in which the single fluid coupling will deliver all the torque.

Certain features disclosed in this application are also disclosed and claimed in my copending application, Serial No. 530,309, filed April 10, 1944, which has now matured into Patent No. 2,519,022.

Having thus described my invention, what I claim as new and desire to secure by United States Letters Patent, is:

1. In a power transmitting system the combination of a driving shaft and a driven shaft, means providing a power train between said shafts and including a fluid coupling and an epicyclic gear set having a sun gear and an intermediate shaft fixedly connected to and rotatable with said sun gear, and means providing a second power train between said driving shaft and epicyclic gear set and including a pair of epicyclic gear sets having annulus gears, sun gears, a tubular shaft connected to said driving shaft and concentrically disposed relative to said intermediate shaft and fixedly connected for rotation with the sun gears of said pair of epicyclic gear units, said second power train providing a power path parallel to said fluid coupling and intermediate shaft and sun gear of said first-mentioned epicyclic gear set.

2. A power transmitting system including, in combination, a driving shaft, a driven shaft axially aligned with and spaced from said driving shaft, an intermediate shaft rotatably supported between the adjacent ends of the driving and driven shafts, a hydrodynamic power transmission system having a first vaned wheel structure secured to said driving shaft and a second vaned wheel structure secured to the intermediate shaft, a first epicyclic gear unit having a sun gear adjacent the driven end of said intermediate shaft and rotatable directly with said intermediate shaft, an annulus gear, a plurality of planet pinions each in mesh with both said sun and annulus gears and a planet carrier for said planet pinions and secured to the driven shaft, a second epicyclic gear unit including a sun gear, an annulus gear and a plurality of planet pinions each in mesh with both said sun and annulus gears, and a planet carrier for said latter planet pinions, a third epicyclic gear unit including a sun gear, an annulus gear and a plurality of planet pinions each in mesh with both said sun and annulus gears, and a planet carrier for said latter planet pinions means including a hollow shaft surrounding said intermediate shaft for rotation relative to the latter and fixedly connecting said two last-mentioned sun gears for rotation with the driving shaft, means drivingly interconnecting the planet carrier of said third epicyclic gear unit to the annulus gear of said second epicyclic gear unit, means drive interconnecting the planet carrier of said second epicyclic gear unit to the annulus gear of said first epicyclic gear unit, brake means for selectively restraining rotation of the annuls gears of the three epicyclic gear units, and clutch means for connecting at least all the elements of said second-mentioned epicyclic gear unit for unitary rotation with said hollow shaft and driving shaft.

3. A power transmitting system including, in combination, a driving shaft, a driven shaft axially aligned with and spaced from said driving shaft, an intermediate shaft rotatably supported between the adjacent ends of the driving and driven shafts, a fluid coupling having a first element secured to said driving shaft and a second element secured to the intermediate shaft, a first epicyclic gear unit having a sun gear adjacent the driven shaft end of said intermediate shaft and rotatable directly with said intermediate shaft, an annulus gear, a plurality of planet pinions each in mesh with both said sun and annulus gears and a planet carrier supporting said planet pinions and connected to rotate the driven shaft, a second epicyclic gear unit including a sun gear, an annulus gear, a plurality of planet pinions each in mesh with both said sun and annulus gears, and a planetary carrier for said latter planet pinions, means including a hollow shaft surrounding said intermediate shaft for rotation relative to the latter and fixedly connecting said last-mentioned sun gear for rotation with the driving shaft, means drivingly interconnecting the planet carrier of said second epicyclic gear unit to the annulus gear member of said first epicyclic gear unit, brake means for selectively restraining the annulus gears of the two epicyclic gear units against rotation, and clutch means for interconnecting all the elements of the second-mentioned epicyclic gear unit for unitary rotation with said driving shaft.

4. In a power transmitting system the combination of a sun gear, a sun gear driving shaft, a first internal gear type epicyclic gear unit including said sun gear and also including an internal gear, a set of planet pinions each meshing with said sun gear and internal gear and an output planet carrier supporting said planet gears, second and third internal gear type epicyclic gear units each comprising a sun gear, an internal gear, a plurality of planet gears and a planet carrier, a tubular sleeve surrounding said driving shaft and fixedly secured for rotation with said second and third sun gears, means operatively connecting the planet carrier of said third unit to the internal gear of the second unit, and means operatively connecting the planet carrier of the second unit to the internal gear of the first unit.

5. In a power transmitting system, in combination, a driving shaft, a driven shaft, hydrodynamic torque transmitting device including an impeller and a turbine, driving means including a planetary gear set operatively connected between said turbine and said driven shaft and comprising a plurality of relatively rotatable elements, releasable means for holding one of said elements against rotation to cause the same to constitute a first-reaction element and establish a power train between said shafts, driving means including a second planetary gear set between said impeller and said reaction element and comprising a plurality of relatively rotatable elements including a sun gear which is connected to rotate in unison with said impeller, and releasable means for holding another of said latter elements against rotation when said sun gear rotates in unison with said impeller to cause the other element to constitute a second reaction element when said first reaction element is released to rotate the first reaction element and establish a second power train between said shafts which is in parallel relationship to and simultaneously effective with said first-mentioned power train, said power trains and fluid coupling jointly producing a driving connection between said shafts different in speed ratio from that produced by said first-mentioned power train when the latter is solely effective.

6. In a power transmitting system, in combination, a driving shaft, a driven shaft, a hydrodynamic torque transmitting device including an impeller operatively connected to said driving shaft for rotation in unison therewith and a turbine, driving means including a planetary gear set operatively connected between said turbine and said driven shaft and comprising a sun gear, a ring gear, a planet gear and a planet carrier, means operatively connecting said sun gear to said turbine for rotation in unison, means operatively connecting said planet carrier to said driven shaft for rotation in unison, means for holding said ring gear against rotation to cause the same to constitute a first reaction element and establish a power train between said turbine and said driven shaft, driving means including a second planetary gear set between said impeller and said driven shaft and including a sun gear rotatable in unison with said impeller, a ring gear, a planet gear and a planet carrier, means operatively connecting said last-mentioned planet carrier to said first-mentioned ring gear, and releasable means for holding said last-mentioned ring gear against rotation to cause the same to constitute a second reaction element when said first reaction element is released to rotate the second reaction element and establish a second power train between said shafts which is in parallel relationship to and simultaneously effective with said first-mentioned power train.

7. In a power transmitting system, in combination, a driving shaft, a driven shaft, driving means including a planetary gear set operatively connected between said shafts and comprising a plurality of relatively rotatable elements, releasable means for holding one of said elements against rotation to cause the same to constitute a first reaction element and establish a power train between said shafts, driving means including a second planetary gear set between said driving shaft and said reaction element and comprising a plurality of relatively rotatable elements, releasable means for holding one of said latter elements against rotation to cause the same to constitute a second reaction element when said first reaction element is released to rotate the first reaction element and establish a second power train between said shafts which is in parallel relationship to and simultaneously effective with said first-mentioned power train, driving means including a third planetary gear set between said driving shaft and said second reaction element and comprising a plurality of relatively rotatable elements, and releasable means for holding one of said last-mentioned elements against rotation to cause the same to constitute a third reaction element when said second reaction element is released to rotate the second reaction element and establish a third power train between said shafts which is in parallel relationship to and simultaneously effective with said first-mentioned power train.

8. In a power transmitting system, in combination, a driving shaft, a driven shaft, driving means including a planetary gear set operatively connected between said shafts and comprising a sun gear, a ring gear, a planet gear and a planet carrier, means operatively connecting said planet carrier to the driven shaft in driving relationship, releasable means for holding said ring gear against rotation to cause the same to constitute a reaction element and establish a low gear ratio power train between said shafts, driving means including a second planetary gear set between said driving shaft and said ring gear and comprising a sun gear, a ring gear, a planet gear and a planet carrier, means operatively connecting said second carrier and first-mentioned ring gear for rotation in unison, releasable means for holding said last-mentioned ring gear against rotation to cause the same to constitute a second reaction element when said first-mentioned ring gear is released to rotate the latter and establish a second power train between said shafts which is in parallel relationship to and simultaneously effective with said first-mentioned power train, driving means including a third planetary gear set between said driving shaft and said second reaction element and comprising a sun gear, a ring gear, a planet gear and a planet carrier, means operatively connecting the sun gears of the second and third planetary gear sets together for rotation in unison, means operatively connecting the planet carrier of the third gear set to the ring gear of the second gear set, and releasable means for holding the ring gear of the third gear set against rotation to cause the same to constitute a third reaction element when the ring gears of said first and second planetary gear sets are released to rotate the ring gear of the second planetary gear set and establish a third power train between said shafts which is in parallel relationship to and simultaneously effective with said first-mentioned power train.

9. In a power transmitting system, in combination, a driving shaft, a driven shaft, a fluid coupling including an impeller and a turbine, driving means including a planetary gear set operatively connected between said turbine and said driven shaft and comprising a plurality of relatively rotatable elements, releasable means for holding one of said elements against rotation to cause the same to constitute a first reaction element and establish a power train between said shafts, driving means including a second planetary gear set between said impeller and said reaction element and comprising a plurality of relatively rotatable elements, releasable means for holding one of said latter elements against rotation to cause the same to constitute a second reaction element when said first reaction element is released to rotate the first reaction element and establish a second power train between said shafts which is in parallel relationship to and simultaneously effective with said first-mentioned power train, driving means including a third planetary gear set between said impeller and said second reaction element and comprising a plurality of relatively rotatable elements, and releasable means for holding one of said latter elements against rotation to cause the same to constitute a third reaction element when said other reaction elements are released to rotate the second reaction element and establish a third power train between said shafts which is in parallel relationship to and simultaneously effective with said first-mentioned power train.

10. In a power transmitting system, in combination, a driving shaft, a driven shaft, a fluid coupling including an impeller and a turbine, driving means including a planetary gear set operatively connected between said turbine and said driven shaft and comprising a plurality of relatively rotatable elements, releasable means for holding one of said elements against rotation to cause the same to constitute a first reaction element and establish a power train between said shafts, driving means including a second planetary gear set between said impeller and said reaction element and comprising a plurality of relatively rotatable elements, releasable means for holding one of said latter elements against rotation to cause the same to constitute a second reaction element when said first reaction element is released to rotate the first reaction element and establish a second power train between said shafts which is in parallel relationship to and simultaneously effective with said first-mentioned power train, driving means including a third planetary gear set between said impeller and said second reaction element and comprising a plurality of relatively rotatable elements, releasable means for holding one of said latter elements against rotation to cause the same to constitute a third reaction element when said other reaction elements are released to rotate the second reaction element and establish a third power train between said shafts which is in parallel relationship to and simultaneously effective with said first-mentioned power train, and releasable clutch means for locking two of the elements of one of said planetary gear sets together to establish a fourth power train between said shafts which is simultaneously effective with said first-mentioned power train.

11. In a power transmitting system, in combination, a driving shaft, a driven shaft, a fluid coupling including an impeller and a turbine, driving means including a planetary gear set operatively connected between said turbine and said driven shaft and comprising a plurality of relatively rotatable elements, releasable means for holding one of said elements against rotation to cause the same to constitute a first reaction element and establish a power train between said shafts, driving means including a second planetary gear set between said impeller and said reaction element and comprising a plurality of relatively rotatable elements, releasable means for holding one of said latter elements against rotation to cause the same to constitute a second reaction element when said first reaction element is released to rotate the first reaction element and establish a second power train between said shafts which is in parallel relationship to and simultaneously effective with said first-mentioned power train, driving means including a third planetary gear set between said impeller and said second reaction element and comprising a plurality of relatively rotatable elements, releasable means for holding one of said latter elements against rotation to cause the same to constitute a third reaction element when said other reaction elements are released to rotate the second reaction element and establish a third power train between said shafts which is in parallel relationship to and simultaneously effective with said first-mentioned power train, and releasable clutch means for locking the sun gear of one of said planetary gear sets to the ring gear thereof to establish a fourth power train between said shafts which is simultaneously effective with said first-mentioned power train.

12. In a power transmitting system, in combination, a driving shaft, a driven shaft, a fluid coupling including an impeller and a turbine, a differential gear unit having a rotary output element connected to said driven shaft and a pair of input elements, means operatively connecting said turbine to one of said input elements to establish a power train that completes a predetermined speed ratio drive between said shafts, and means selectively operable at will to complete a reduced drive power train in parallel with said first train and extending from said impeller element to said other input element while said connecting means is effective to thereby vary the rate of rotation of said output element and consequently to vary the speed ratio drive between said shafts.

13. In a power transmitting system, in combination, a driving shaft, a driven shaft, a fluid coupling including an impeller connected to said driving shaft and a turbine, a first differential gear unit having a rotary output element connected to said driven shaft, and first and second rotary input elements, means operatively connecting said turbine to the first input element, releasable means operable at will to hold the second input element stationary whereby said output element and driven shaft derive their rotary motion solely from the motion applied to said first input element by said turbine, a second differential gear unit having a rotary output element connected to the second input element of said first differential gear unit and having first and second rotary input elements, means operatively connecting said impeller to the first input element of said second differential gear unit, releasable means operable at will to hold the second input element of said second differential gear unit stationary whereby the output element of said second differential gear unit derives its motion solely from the motion applied to the first input element of said second differential gear unit by said impeller, and releasable means operable at will to connect the second input element of said second differential gear unit to said impeller whereby, when said releasable holding means for said second input element of the second differential gear unit is released, the motion of the output element of the second differential gear unit is a combined function of the motions of the first and second input elements of the second differential gear unit.

14. In a power transmitting system, in combination, a driving shaft, a driven shaft, a first differential gear unit having a rotary output element connected to said driven shaft and first and second input elements, means operatively connecting said driving shaft to the first input element, releasable means operable at will to hold the second input element stationary to establish a power train between said driving shaft and said driven shaft and consequently a low speed gear ratio drive between said driving and driven shafts, a rotary output element connected to the second input element of the first differential gear unit and having first and second input elements, means operatively connecting said driving shaft to the first input element of said second differential gear unit, releasable means operable at will to hold the second input element of said second differential gear unit stationary to establish another power train from said driving shaft through the first input element of the second differential gear unit to said driven shaft while said first power train is effective to establish a second speed gear ratio drive between said driving shaft and said driven shaft, and releasable means operable at will to connect the second input element of said second differential gear unit to said driving shaft to establish another power train from said impeller through said second input element of the second differential gear unit to said driven shaft while said first and second power trains are effective to establish a third speed gear ratio drive between said driving shaft and said driven shaft.

15. In a power transmitting system, in combination, a driving shaft, a driven shaft, a fluid coupling including an impeller and a turbine, means operatively connecting said impeller and driving shaft in driving relationship, a first differential gear unit having a rotary output element connected to said driven shaft, and first and second input elements, means operatively connecting said turbine to the first input element, releasable means operable at will to hold the second input element stationary to establish a power train between said turbine and said driven shaft and consequently a low speed gear ratio drive between said driving and driven shafts, a second differential gear unit having a rotary output element connected to the second input element of the first differential gear unit and having first and second input elements, means operatively connecting said impeller to the first input element of said second differential gear unit, releasable means operable at will to hold the second input element of said second differential gear unit stationary to establish another power train from said impeller through the first input element of the second differential gear unit to said driven shaft while said first power train is effective to establish a second speed gear ratio drive between said driving shaft and said driven shaft, and releasable means operable at will to connect the second input element of the second differential gear unit to said impeller to establish another power train from said impeller through said second input element of the second differential gear unit to said driven shaft while said first and second power trains are effective to establish a third speed gear ratio drive between said driving and said driven shaft.

16. In a power transmitting system, in combination, a driving shaft, a driven shaft, a fluid coupling including an impeller and a turbine, means operatively connecting said impeller and driving shaft in driving relationship, a first differential gear unit having a rotary output element connected to said driven shaft, and first and second input elements, means operatively connecting said turbine to the first input element, releasable means operable at will to hold the second input element stationary to establish a power train between said turbine and said driven shaft and consequently a low speed gear ratio drive between said driving and driven shafts, a second differential gear unit having a rotary output element connected to the second input element of the first differential gear unit and having first and second input elements, means operatively connecting said impeller to the first input element of said second differential gear unit, releasable means operable at will to hold the second input element of said second differential gear unit stationary to establish another power train from said impeller through the first input element of the second differential gear unit to said driven shaft while said first power train is effective to establish a second speed gear ratio drive between said driving shaft and said driven shaft, releasable means operable at will to connect the second input element of the second differential gear unit to said impeller to establish another power train from said impeller through said second input element of the second differential gear unit to said driven shaft while said first and second power trains are effective to establish a third speed gear ratio drive between said driving and said driven shaft, a third differential gear unit having an output element connected to the second input element of the second differential gear unit and having first and second input elements, means operatively connecting said impeller to the first input element of said third differential gear unit, and releasable means operable at will to connect the first input element of the third differential gear unit to the second input element thereof, to establish a direct drive from said impeller element through said third, second, and first differential gear units to said driven shaft while said first power train is effective to establish a fourth speed gear ratio drive between said driving shaft and said driven shaft.

17. In a power transmitting system, in combination, a driving shaft, a driven shaft, a first differential gear unit having a rotary output element connected to said driven shaft and first and second input elements, means operatively connecting said driving shaft to the first input element, releasable means operable at will to hold the second input element stationary to establish a power train between said driving shaft and said driven shaft and consequently a low speed gear ratio between said driving and driven shafts, a rotary output element connected to the second input element of the first differential gear unit and having first and second input elements, means operatively connecting said driving shaft to the first input element of said second differential gear unit, releasable means operable at will to hold the second input element of said second differential gear unit stationary to establish another power train from said driving shaft through the first input element of said second differential gear unit to said driven shaft while said first power train is effective to establish a second speed gear ratio drive between said driving shaft and said driven shaft, releasable means operable at will be connect the second input element of the second differential gear unit to said driving shaft to establish another power train from said impeller through said second input element of the second differential gear unit to said driven shaft while said first and second power trains are effective to establish a third speed gear ratio drive between said driving shaft and said driven shaft, a third differential gear unit having an output element connected to the second input element to the second differential gear unit and having first and second input elements, means operatively connecting said driving shaft to the input element of said third differential gear unit, and releasable means operable at will to connect the first and second input elements of the third differential gear unit together to establish a direct drive through all of said differential gear units between said driving shaft and said driven shaft.

18. In a power transmitting system, in combination, a driving shaft, a driven shaft, a hydrodynamic torque transmitting device including an impeller and a turbine, a differential gear unit having a rotary output element connected to said driven shaft and a pair of input elements, means operatively connecting said turbine to one of said input elements to establish a power train that completes a predetermined speed ratio drive between said shafts, means selectively operable at will to complete a reduced drive power train extending from said impeller element to said other input element while said connecting means is effective to thereby change the rate of rotation of said output element and consequently to change the speed ratio drive between said shafts, and means selectively operable at will to complete a different reduced drive power train extending from said impeller to said other input element while said connecting means is effective to further change the rate of rotation of said output element and consequently further change the speed ratio drive between said shafts.

19. In a power transmitting system, in combination, a driving shaft, a driven shaft, a hydrodynamic torque transmitting device including an impeller and a turbine, a differential gear unit having a rotary output element connected to said driven shaft and a pair of input elements, means operatively connecting said turbine to one of said input elements to establish a power train that completes a predetermined speed ratio drive between said shafts, means selectively operable at will to complete a reduced drive power train extending from said impeller element to said other input element while said connecting means is effective to change the rate of rotation of said output element and consequently to change the speed ratio drive between said shafts, means selectively operable at will to complete a different reduced drive power train extending from said impeller to said other input element while said connecting means is effective to further change the rate of rotation of said output element and consequently further change the speed ratio drive between said shafts, and means selectively operable at will to connect said impeller element to said other input element while said first connecting means is effective to still further change the rate of rotation of said output element and consequently still further change the speed ratio drive between said shafts.

EVERETT R. BURTNETT.

REFERENCES CITED

The following references are of record in the file of this patent:

UNITED STATES PATENTS

| Number | Name | Date |
|---|---|---|
| 2,127,655 | Stromquist | Aug. 23, 1938 |
| 2,135,246 | Yoxall | Nov. 1, 1938 |
| 2,176,138 | Kelley | Oct. 17, 1939 |
| 2,324,713 | McFarland | July 20, 1943 |
| 2,329,724 | Maurer | Sept. 21, 1943 |
| 2,371,574 | Swennes | Mar. 13, 1945 |
| 2,377,696 | Kelley | June 5, 1945 |

FOREIGN PATENTS

| Number | Country | Date |
|---|---|---|
| 489,029 | Great Britain | July 18, 1938 |